(12) United States Patent
Merklein

(10) Patent No.: US 7,756,733 B2
(45) Date of Patent: Jul. 13, 2010

(54) METHOD FOR OPERATING AND DEVICE FOR MONITORING A TECHNICAL INSTALLATION

(75) Inventor: Thomas Merklein, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1426 days.

(21) Appl. No.: 10/204,695

(22) PCT Filed: Feb. 2, 2001

(86) PCT No.: PCT/DE01/00416

§ 371 (c)(1),
(2), (4) Date: Aug. 23, 2002

(87) PCT Pub. No.: WO01/63371

PCT Pub. Date: Aug. 30, 2001

(65) Prior Publication Data

US 2003/0014298 A1    Jan. 16, 2003

(30) Foreign Application Priority Data

Feb. 25, 2000 (DE) .............................. 100 08 812

(51) Int. Cl.
*G06F 9/46* (2006.01)
(52) U.S. Cl. ............. 705/7; 705/9; 705/11; 700/23; 700/29; 700/79; 700/83; 702/181; 702/185
(58) Field of Classification Search .............. None
See application file for complete search history.

(56) References Cited

U.S. PATENT DOCUMENTS

| | | | | |
|---|---|---|---|---|
| 4,700,326 A | * | 10/1987 | Florine | 700/23 |
| 4,740,349 A | | 4/1988 | Loftus et al. | |
| 4,754,409 A | * | 6/1988 | Ashford et al. | 706/10 |
| 4,970,664 A | * | 11/1990 | Kaiser et al. | 715/804 |
| 5,214,577 A | * | 5/1993 | Sztipanovits et al. | 700/79 |
| 5,237,518 A | * | 8/1993 | Sztipanovits et al. | 702/185 |
| 5,295,244 A | * | 3/1994 | Dev et al. | 715/853 |
| 5,311,562 A | * | 5/1994 | Palusamy et al. | 376/215 |
| 5,420,977 A | * | 5/1995 | Sztipanovits et al. | 715/853 |

(Continued)

FOREIGN PATENT DOCUMENTS

DE    3609927    10/1987

(Continued)

OTHER PUBLICATIONS

Tarifa, Enrique E.; Scenna, Nicolas J. "Fault diagnosis, direct graphs, and fuzzy logic" Computers chem. Engng, vol. 21, Suppl., pp. S649-S654, 1997 © 1997 Elsevier Science Ltd.*

(Continued)

*Primary Examiner*—Bradley B Bayat
*Assistant Examiner*—Alan Miller
(74) *Attorney, Agent, or Firm*—Harness, Dickey & Pierce, P.L.C.

(57) ABSTRACT

A technical installation contains several systems for resolving different system management tasks. Information variables are hierarchically arranged in the systems. A value of an information variable pertaining to the lowest hierarchical level triggers an event and pertains to a significant range of values. The value and the appurtenant location are found by specifically tracking all systems.

7 Claims, 1 Drawing Sheet

U.S. PATENT DOCUMENTS

| | | | | | |
|---|---|---|---|---|---|
| 5,623,109 | A | * | 4/1997 | Uchida et al. | 73/865.9 |
| 5,774,121 | A | * | 6/1998 | Stiegler | 715/769 |
| 5,864,662 | A | * | 1/1999 | Brownmiller et al. | 714/43 |
| 5,914,875 | A | * | 6/1999 | Monta et al. | 700/79 |
| 6,031,453 | A | * | 2/2000 | Brinzer | 340/525 |
| 6,690,274 | B1 | * | 2/2004 | Bristol | 340/506 |
| 6,707,795 | B1 | * | 3/2004 | Noorhosseini et al. | 370/242 |
| 7,085,610 | B2 | * | 8/2006 | Eryurek et al. | 700/29 |
| 7,206,646 | B2 | * | 4/2007 | Nixon et al. | 700/83 |
| 2001/0039577 | A1 | * | 11/2001 | Barkai et al. | 709/223 |

FOREIGN PATENT DOCUMENTS

| | | |
|---|---|---|
| DE | 4210420 | 10/1993 |
| DE | 19533787 | 3/1997 |
| EP | 0482523 | 4/1992 |
| EP | 0482523 A2 * | 4/1992 |
| EP | 482523 A2 * | 4/1992 |
| JP | 63106810 A | 5/1988 |
| JP | 2161567 A | 6/1990 |
| JP | 5296889 A | 11/1993 |
| JP | 2000010607 A | 1/2000 |

OTHER PUBLICATIONS

Chung, Donald T.; Modarres, Mohammed "Gotres: An Expert System for Fault Detection and Analysis" Institute for Systems Research; Technical Report 1988-38 1988.*

Dash, Sourabh, Venkatasubramanian, Venkat "Challenges in the industrial applications of fault diagnostic systems" Computers and Chemical Engin~dng 24 (2000) 785-791.*

Cotnareanu, Teodor "Old tools—new uses: Equipment FMEA" Quality Progress; Dec. 1999; 32, 12; ABI/INFORM Global p. 48.*

Stamatelotos, Michael; Vesely, William; Dugan, Joanne; Fragola, Joseph; Minarick III, Joseph; Railsback, Jan "Fault Tree Handbook with Aeorspace Applications" Prepared for NASA Office of Safety and Mission Assurance NASA Headquarters Washington, DC 20546 Aug. 2002.*

Huang, C.Q.; Nie, M.; Mak, K.L. "Web-Based Failure Mode and Effect Analysis (FMEA)"Computers & Industrial Engineering 37 (1999) 177-180.*

Narasimhan, Sriram; Zhao, Feng; Biswas, Gautam; Hung, Elmer "Fault Isolation in Hybrid Systems Combining Model Based Diagnosis and Signal Processing" Copyright 2000 IFAC.*

Mohr, R.R. "Failure Modes and Effects Analysis" Sverdup, 8th Edition Jan. 1994.*

Stevens, Tim "Method to the madness" Industry Week; Nov. 18, 1996; 245, 21; ABI/INFORM Global p. 34.*

Ginn, D.M.; Jones, D.V.; Rahnejat, H.; Zairi, M. "The "QFD/FMEA interface"" European Journal of Innovation Management. Bradford: 1998. vol. 1, Iss. 1; p. 7.*

Vesely, W.E.; Goldberg, F.F.; Roberts, N.H.; Hassi, D.F. "Fault Tree Handbook" Systems and Reliability Research, Jan. 1981.*

Teng, Sheng-Hsien (Gary); Ho, Shin-Yann (Michael) "Failure mode and effects analysis An integrated approach for product design and process control" The International Journal of Quality & Reliability Management. Bradford: 1996. vol. 13, Iss. 5; p. 8.*

Loer, Karsten "Model-based Automated Analysis for Dependable Interactive Systems" The University of York, Human-Computer Interaction Group Department of Computer Science, Aug. 2003.*

Katker, Stefan; Geihs, Kurt "A Generic Model for Fault Isolation in Integrated Management Systems" Journal of Network and Systems Management, Springer New York ISSN 1064-7570 (Print) 1573-7705 (Online) Issue vol. 5, No. 2 / Jun. 1997 DOI 10.1023/A:1018766610444 pp. 109-130.*

Japanese Office Action dated Dec. 15, 2009 for Japanese Patent Application No. 2001562270 (w/English translation).

* cited by examiner

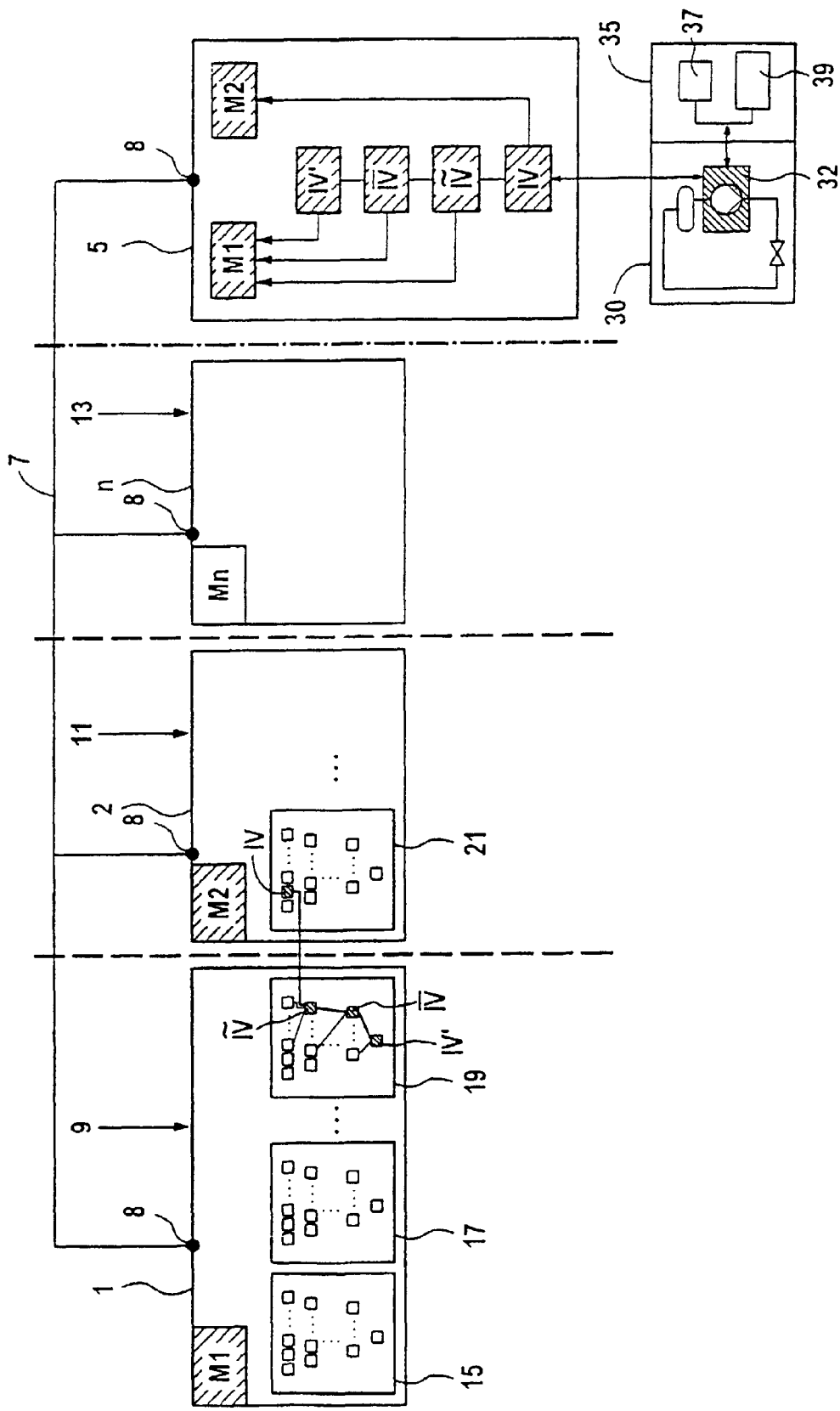

METHOD FOR OPERATING AND DEVICE FOR MONITORING A TECHNICAL INSTALLATION

This application is the national phase under 35 U.S.C. §371 of PCT International Application No. PCT/DE01/00416 which has an International filing date of Feb. 2, 2001, which designated the United States of America and which claims priority on German Patent Application No. 100 08 812.0 filed Feb. 25, 2000, the entire contents of which are hereby incorporated herein by reference.

FIELD OF THE INVENTION

The invention generally relates to a method for operating a technical installation. The technical installation preferably includes a number of systems for performing different system management tasks. The invention also generally relates to a device for monitoring a technical installation of this type.

BACKGROUND OF THE INVENTION

In modern complex technical installations, a control system which registers the states of all the parts of the installation at each point in time during operation and makes all the information necessary for operating the technical installation available to the operating personnel is used for controlling production. It is also possible to use protection systems, which in hazardous situations quickly and reliably shut down all the respectively affected sections of the installation or components—independently of other systems—to avert damage to material and personnel. It is additionally possible to use a system for maintaining operation, in which all the data necessary for advance planning of the operation of the technical installation are managed, such as for example servicing plans, keeping of spare parts, ordering procedures, etc. The business management aspects of a technical installation can also be handled in a separate system. There, the detailed production costs can be calculated for example, these costs arising as a result of boundary conditions such as costs of raw materials, personnel, transport and machine running times, and calculations for cost optimization may also be carried out, for example. The systems of the technical installation that have been mentioned are to be understood as given by way of example, and it is also possible to use a series of further systems, or else fewer individual systems.

It is customary to divide the tasks of a technical installation among a number of specialized systems in this way. However, this involves the difficulty of tracing the underlying cause of an event reported by one of the system, since the information on the operating state of the technical installation is distributed among a number of systems and it is generally necessary to change between a number of systems in order for example to trace the message of a fault back to its underlying triggering causes.

SUMMARY OF THE INVENTION

An embodiment of the invention is based on an object of specifying a method for operating a technical installation with a number of systems for performing different system management tasks, with the aid of which the information distributed among the various systems can be brought together in a context-dependent manner.

According to an embodiment of the invention, the method comprises the following steps:

1. The tasks relevant for the technical installation are predefined.
2. For processing different values of information to be registered by the systems to perform their tasks, information variables are predefined.
3. The information variables are assigned in advance a number of hierarchies of derived information variables, an information variable of a higher level being formed from at least one information variable of the next-lower level and the relationship between the information variables of the various hierarchical levels being documented.
4. The information variables and the derived information variables are assigned the locations at which their values to be processed during later operation arose and the representations of said locations in the systems.
5. A significant range of values is fixed for each information variable and derived information variable.
6. During operation, the systems make available the current or archived values of the information variables and derived information variables used for performing their tasks.
7. If a value of the information variable or derived information variable made available falls within the significant range of values, the information variable or derived information variable is marked.
8. The tasks dependent on marked information variables or derived information variables are marked.
9. The at least one value of an information variable of the lowest hierarchical level that is causally responsible for the occurrence of a value of an information variable or derived information variable falling within a significant range of values, and the location or locations where said causal value arose, are specifically identified by tracing back in a hierarchically descending step-by-step progression from the at least one marked task via the marked derived information variables to the at least one marked information variable of the lowest hierarchical level.

During the operation of the technical installation, items of information which are registered and processed by the respective specialized system according to the task to be performed arise at the various locations. If, for example, a part of the installation or a component has a critical state during operation, this information is registered in the associated specialized system. This message, and possibly further items of information, are generally used to form higher-level messages, known as collective messages, in a number of steps and is passed on to other systems. For example, a collective message that a system section is not available is passed on by a servicing system to the control system, but it is normally not possible from the viewpoint of the control system to ascertain in detail from this passed-on information which component of the system section affected led to the non-availability of the system section. For example, ongoing servicing work on a component of a system section could lead to its non-availability; the said servicing work is managed in a system for maintaining operation, which merely passes on to the control system the collective message concerning the non-availability of the system section affected.

When the aforementioned collective message occurs in the control system, the operating personnel of the technical installation would then have to change to the system for maintaining operation to find out the actual cause of the non-availability—that is the ongoing servicing work on a specific component; in this case it is sometimes necessary also to change between a number of systems. What is more, the relationship between the items of information generated in the various systems often cannot be traced back unequivocally and straight away; a certain degree of intuition on the part of the operating personnel is therefore often essential.

The method of the type according to an embodiment of the invention allows the cause of a reported event to be specifically traced, without having to change between the systems to do so. The method can be implemented for example in a separate system. If the method is applied to the archived information of the systems, a fault analysis looking back in the past until it finds the causally triggering cause is possible. Such knowledge of relationships pertaining to faults of the past can be profitably used for the present and future operation of the technical installation.

In an advantageous refinement of the invention, the locations at which the values to be processed during operation arose are linked with additional information, which during the tracing-back from the at least one marked task via the marked derived information variables to the at least one marked information variable of the lowest hierarchical level can be specifically called up.

This additional information may be, for example, manuals, operating instructions, workshop plans, circuit manuals, printouts of computer programs, etc. In particular in the case of malfunctions, such available additional information can contribute to eliminating the cause of the malfunction more quickly.

An embodiment of the invention therefore leads to a device for monitoring a technical installation. In this device, each system is implemented in a corresponding computing stage, and the monitoring takes place through a corresponding data exchange between the systems themselves and a monitoring stage with a display of the identified information variables and locations where they arose. The function of the monitoring stage and the display may already be integrated in one of the computing stages; in this case, it is possible to dispense with a dedicated monitoring stage.

BRIEF DESCRIPTION OF THE DRAWINGS

The drawing illustrates an exemplary embodiment of the invention. Represented in this example are a number of systems for performing the various system management tasks of a technical installation, which are respectively installed in a computer of their own, and also a further system in a separate computer for carrying out the method according to the invention. The dividing up of the systems and their hardware implementation may, however, also be performed in a different way.

DETAILED DESCRIPTION OF THE PREFERRED EMBODIMENTS

A system 1 contains a number of hierarchies 15, 17 and 19 of information variables, in which the information variables of the lowest hierarchical level are provided with current values 9 during the operation of the technical installation. These are used to form derived information values of a higher hierarchical level—known as collective messages. These may also be formed by including information values or derived information values of other systems. A marking M1 is then set if, within the system 1, at least one value of an information variable or derived information variable falls within a fixed significant range of values. The marking M1 thus indicates that within the system 1 there is at least a noteworthy state of a part of the installation or a component.

A system 2 likewise serves for performing another specific task of the system management of the technical installation. Like the system 1, it is similarly supplied with current values 11 of the technical installation which are necessary for performing this task. The forming of a number of hierarchies 21 of information variables takes place in this case in a way corresponding to that in the case of system 1. A marking M2 is set for the system 2 if at least one value of an information variable or derived information variable falls within the significant range of values, that is to say there is at least one noteworthy state of a system section of the system 2 or a component.

The system n is likewise a further system for performing a specific system management task of the technical installation. Like the other systems, it is correspondingly supplied with current values 13 from the technical installation. As in the case of the other systems, a number of hierarchies of information variables are similarly formed in the system n. The marking Mn indicates for the system n whether at least one current value of an information variable or derived information variable falls within the significant range of values, that is to say whether there is at least one noteworthy state of a system section of the system n or a component.

A further system 5 serves for carrying out the method according to the invention. The connection 7 describes a bidirectional communication link between the terminals 8 of the systems 1 to n and of the further system 5. The systems 1 to n pass on to the further system 5 references appertaining to the information variables IV marked in them or derived information variables $\tilde{IV}$, $\overline{IV}$ and IV' and also the status of their respective marking M1 to Mn. Linking items of information in this way by means of references is known and is referred to as indirect addressing. In this example, this does not involve items of information being passed on from a first system to a second system in the form of copies, but rather it is sufficient for the first system to notify the second system at which place in the first system the information is located. This avoids redundant or multiply redundant replication of the information base.

With knowledge of the places at which the systems 1 to n have stored their marked information variables or derived information variables with the current values, and with knowledge of the states of the markings M1 to Mn, the system 5 can carry out a specific search for the original cause of an event with the aid of the documented relationships between the information variables and derived information variables. In this search, the operator of the system 5 is guided step by step from at least one of the set markings M1 or M2 via the marked derived information variables IV', $\overline{IV}$ and $\tilde{IV}$ to the marked information variables IV of the lowest hierarchical level. The value of the marked information variable IV of the lowest hierarchical level causally forms the value of the derived marked information variable $\tilde{IV}$ whose value causes the value of the derived marked information variable $\overline{IV}$ which forms the value of the derived marked information variable IV'. The markings M1 and M2 of the systems 1 and 2, respectively, are set because in both systems there is at least one marked information variable or derived information variable.

Particularly in relatively complex technical installations, the use of the method according to the invention can lead to a significantly accelerated search for the cause of a malfunction. Consequently, hazards can be eliminated more quickly and downtimes can be reduced.

The marked information variable IV is assigned a location 30 at which the cause of the malfunction is located; here in the example it is a defective pump 32. The location 30 is linked with additional information 35, comprising operating instructions 37 and circuit manuals 39, the use of which helps to eliminate the malfunction quickly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for operating a technical installation including a plurality of systems for performing different system management tasks, comprising the following steps:
   a) defining the tasks relevant to performing operations of the technical installation;
   b) defining information variables for processing different values of information to be registered by the systems performing the tasks;
   b1) deriving information variables from the defined information variables;
   c) assigning the defined information variables and the derived information variables to a number of hierarchical levels, a defined information variable or derived information variable of a higher hierarchical level being formed from at least one defined information variable or derived information variable of the next-lower hierarchical level;
   c1) storing in at least one computer a relationship between the defined information variables and the derived information variables;
   d) assigning the defined information variables and the derived information variables location information to indicate a physical location within the technical installation, the defined information variables and the derived information variables relate to at least one of an operation performed at the physical location of the technical installation and a component located at the physical location of the technical installation;
   e) determining a range of values for each of the defined information variables and the derived information variables;
   f) during operation, having the systems make available at least one of current and archived values of the defined information variables and the derived information variables used for performing the tasks to a control system of the technical installation;
   g) marking the defined information variables when values of the defined information variables are within the range of determined values for the defined information variables;
   g1) marking the derived information variables when values of the derived information variables are within the range of determined values for the derived information variables;
   h) marking at least one of the tasks correlated with at least one of the systems using the at least one computer when at least one of the defined information variables and the derived information variables associated with the at least one of the tasks are marked;
   i) specifically identifying at least one value of one of the defined information variables of a lowest hierarchical level, that is causally responsible for an occurrence of a value of at least one of the defined information variables or the derived information variables being within the determined ranges of values for the corresponding defined information variables or the corresponding derived information variables;
   j) determining the physical location within the technical installation based on the location information assigned to the one of the defined information variables of the lowest hierarchical level; and
   k) tracing back in a hierarchically descending step-by-step progression from the at least one marked task via the marked derived information variables to the one of the defined information variable of the lowest hierarchical level using the stored relationship between the one of the defined information variables of the lowest hierarchical level and the derived information variables.

2. The method as claimed in claim 1, further comprising: retrieving additional information for the one of the defined information variable of the lowest hierarchical level, the additional information including at least one of operating instructions and circuit manuals associated with an operation performed at or component of the physical location to which the at least one marked defined information variable of the lowest hierarchical level is assigned.

3. The method of claim 1, wherein derived information variables of a higher hierarchical level are collective messages.

4. The method of claim 3, wherein collective messages are also be formed by including a defined information variable or derived information variables of other systems.

5. A device for monitoring a technical installation including a number of systems for performing different system management tasks, comprising:
   a computing stage, assigned to at least one computer for each system, for performing the tasks defined relevant to performing operations of the technical installation; and
   a monitoring stage specifically identifying at least one value of a defined or derived information variable of a lowest hierarchical level that is causally responsible for an occurrence of a value of a defined information variable or derived information variable being within a range of values, and at least one physical location of the technical installation where said causal value arose, wherein the computing stages
   assign hierarchical levels to the defined information variables and the derived information variables, a defined information variable or derived information variable of a higher hierarchical level being formed from at least one defined information variable or derived information variable of the next-lower hierarchical level,
   storing the relationship between the defined and derived information variables of the various hierarchical levels,
   assign the defined information variables and the derived information variables location information to indicate the physical location within the technical installation, the defined information variables and the derived information variables relate to at least one of an operation performed at the physical location of the technical installation and a component located at the physical location of the technical installation corresponding to the assigned location information,
   determine the range of values for each of the defined information variables and derived information variables,
   receive at least one of current and archived values of the defined information variables or derived information variables,
   mark the defined information variables when values of the defined information variables are within the determined range of values for the defined information variables, mark the derived information variables when a value of the derived information variables is within the determined range of values for the derived information variables, mark at least one of the tasks correlated with at least one of the systems using the at least one computer [when at least one of the defined information variables or derived information variables associated with the at least one of the tasks are marked, and wherein the monitoring stage traces back in a hierarchically descending step-by-step progression from the at least one marked task to the marked derived information variables to the at least one marked defined information variable of the lowest hierarchical level to specifically identify at least one value of a defined information variable of a lowest hierarchical level that is causally responsible for the occurrence of the value of the defined information variable or the derived information variable being within the determined range of values, and the at least one location where said causal value arose.

6. The device of claim 5, wherein the derived information variables of a higher hierarchical level are collective messages.

7. The device of claim 6, wherein collective messages are also be formed by including defined information variables or derived information variables of other systems.

* * * * *